Dec. 8, 1931.  H. H. LINN  1,835,506
UNIVERSAL JOINT
Filed April 2, 1928   2 Sheets-Sheet 1

INVENTOR.
H. H. LINN.
BY
ATTORNEY.

Dec. 8, 1931.   H. H. LINN   1,835,506
UNIVERSAL JOINT
Filed April 2, 1928   2 Sheets-Sheet 2

INVENTOR.
H. H. LINN.
BY Jas. A. Richmond
ATTORNEY.

Patented Dec. 8, 1931

1,835,506

UNITED STATES PATENT OFFICE

HOLMAN HARRY LINN, OF MORRIS, NEW YORK, ASSIGNOR TO THE LINN MANUFACTURING CORPORATION, OF MORRIS, NEW YORK, A CORPORATION OF NEW YORK

UNIVERSAL JOINT

Application filed April 2, 1928. Serial No. 266,824.

The invention is directed to an improvement in universal joints and propeller shafts for connecting two units which are practically on the same center line and subject to incidental and infrequent deflection such as an automobile engine with the transmission and the transmission with the differential.

The primary object is to provide mating elements normally centered under a yielding resistance and coupled to permit a center line deflection to the extent of four or five degrees.

A further object is the provision of a universal joint assembly affording natural storage of lubricant and in which the contained lubricant is directed centrifugally to the points where it is required, a lubricant seal being established which operates materially to reduce leakage.

Other objects as well as the nature, characteristic features and scope of the invention will more readily be understood from the following description taken in connection with the accompanying drawings, wherein Figure 1 is a broken plan, partly in longitudinal section, showing a combined propeller shaft and universal joint.

Figure 1:
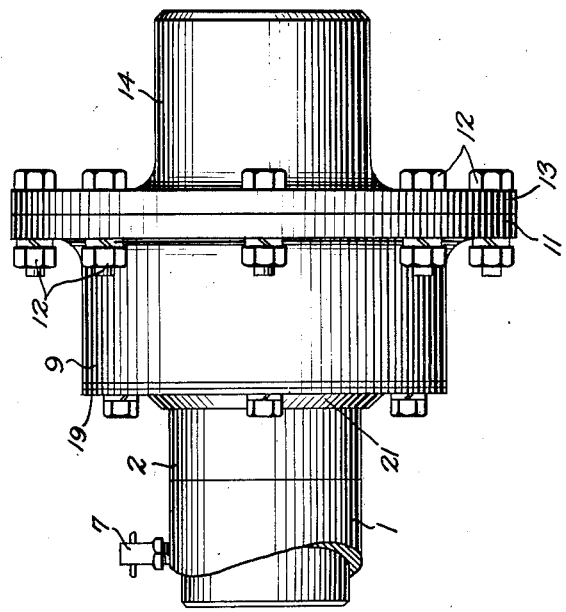
Figure 1:
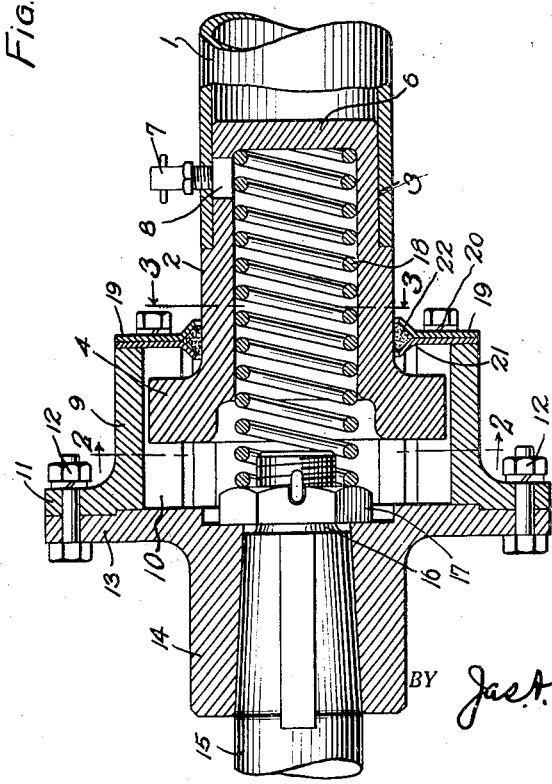
Figure 2:
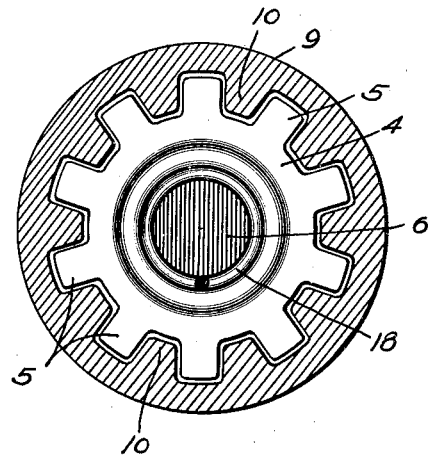
Fig. 2 is a section on line 2—2 of Fig. 1.
Figure 3:
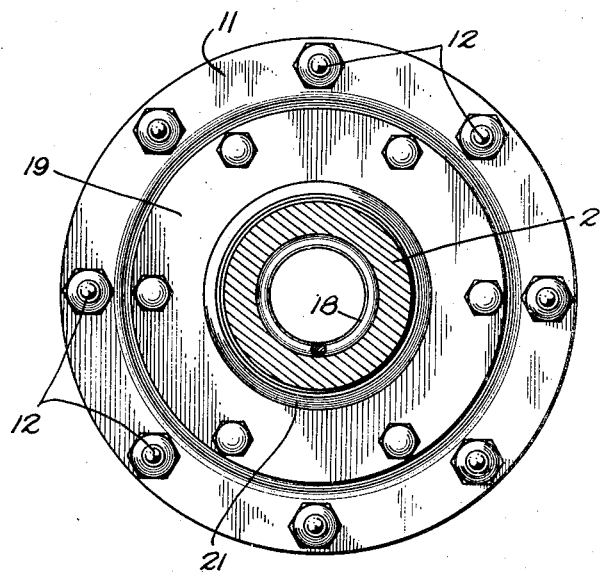
Fig. 3 is a section on line 3—3 of Fig. 1.

The preferred construction embodies a tubular propeller shaft 1 provided at its ends with universal joint assemblies of duplicate construction.

Each of said assemblies includes a hardened steel hub 2 having a reduced portion or seat 3 to accommodate the end of the propeller shaft which is preferably further secured, as by welding.

The other end of the hub is formed with a rim 4 splined as at 5. The bore of the hub is closed by a wall 6 at the shaft end and fully open at the opposite end, whereby it may serve in part as a lubricant receptacle, the propeller shaft being provided with a grease cup 7 which communicates with the hub through an opening 8 in the wall thereof.

A hardened steel cup 9 is broached as at 10 to fit the splined rim of the hub. The fit is relatively loose so that the hub or cup may depart from the center line to the extent of four or five degrees.

The cup has a flange 11 which is bolted, as at 12, to the flange 13 of a collar 14 on the shaft 15 of the unit to be driven.

Shaft 15 has a reduced end 16 extending into the cup and threaded for the reception of a nut 17, which bears against the cup side of the flange connection 14.

In order to center the tube and hub assembly and to prevent too much end play, there is provided a coil spring 18 whereof one end encircles the shaft extension 16 and whereof the other end bears against the end wall 6 of the hub.

19 are retainer plates, operating as at 20, to hold the parts and cooperating to form a channel 21 to confine a felt or packing strip 22 spaced from the rim designed to engage and bear upon the hub with sufficient pressure to prevent escape of the lubricant and to exclude foreign matter.

The chamber established by the cup and hub insures adequate storage of lubricant and by disposing the felt or packing beyond the spline connection full advantage is taken of the centrifugal action developed to flood the spline connection with lubricant and with substantially no loss.

Having described my invention, I claim:

1. In a universal joint, a cup removably secured to one shaft section, a hollow hub secured to the other shaft section, a rim integral with the hub and fitting within the cup, the rim and cup being formed for driving relation with permissible center line deflection, means engaging the exterior of the hub for sealing the cup beyond the rim, and a spring bearing against one end of the first mentioned shaft section and fitted within the hollow hub to center the parts and prevent undue end play.

2. In a universal joint, a hollow hub terminating in a circumferentially enlarged end rim, a cup internally formed for driving connection with the rim while permitting limited relative play, said hub providing a lubricant reservoir for serving the cup and rim through the action of centrifugal force, and a spring operatively disposed within the hub and with relation to the cup for centering the hub and cup assembly and to prevent undue end play of the parts.

3. In a universal joint, a cup internally broached, a hollow hub fitted within the cup and of materially less diameter than such cup, said hub terminating in a circumferentially-enlarged rim splined for driving connection with the broached cup, a spring fitting within and throughout the length of the hollow hub and bearing against the cup, said hollow hub serving as a lubricant reservoir to serve the rim and cup through centrifugal force, and a seal carrier secured to the end of the cup and carrying a sealing member bearing on the hollow hub inwardly of the driving connection between the hub and cup.

In testimony whereof I affix my signature.

HOLMAN HARRY LINN.